(12) United States Patent
Dass et al.

(10) Patent No.: US 10,755,033 B1
(45) Date of Patent: Aug. 25, 2020

(54) DIGITAL CONTENT EDITING AND PUBLICATION TOOLS

(71) Applicant: Amazon Technologies, Inc., Seattle, WA (US)

(72) Inventors: Ramya Dass, Chennai (IN); Kaushik Ramachandran, Theni (IN); Vasanth Elancheralathan, Puducherry (IN); Palanisamy Chinnusamy, Namakkal (IN); Rajasekaran Nagarajan, Chennai (IN); Senthilkumar Ponnappan, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 121 days.

(21) Appl. No.: 15/714,237

(22) Filed: Sep. 25, 2017

(51) Int. Cl.
| | | |
|---|---|---|
| *G06F 40/166* | (2020.01) | |
| *G06N 5/00* | (2006.01) | |
| *G06F 40/117* | (2020.01) | |
| *G06F 40/197* | (2020.01) | |
| *G06F 40/258* | (2020.01) | |
| *G06F 9/445* | (2018.01) | |
| *G06F 17/00* | (2019.01) | |

(52) U.S. Cl.
CPC .......... *G06F 40/166* (2020.01); *G06F 40/117* (2020.01); *G06F 40/197* (2020.01); *G06F 40/258* (2020.01); *G06N 5/003* (2013.01); *G06F 9/44526* (2013.01)

(58) Field of Classification Search
CPC ...... G06F 17/24; G06F 17/218; G06F 40/166; G06F 40/197; G06F 40/117; G06F 40/258; G06F 9/44526; G06N 5/003
See application file for complete search history.

(56) References Cited

U.S. PATENT DOCUMENTS

| | | | |
|---|---|---|---|
| 8,346,585 B1 | 6/2013 | Griffith et al. | |
| 8,782,516 B1 * | 7/2014 | Dozier | G06F 40/117 715/243 |
| 8,798,366 B1 | 8/2014 | Jones et al. | |
| 8,819,541 B2 | 8/2014 | Nicholas et al. | |
| 8,930,575 B1 | 1/2015 | Bianco et al. | |
| 9,053,190 B1 * | 6/2015 | Boenau | G06F 16/9535 |

(Continued)

OTHER PUBLICATIONS

Author unknown; Amazon Kindle Direct Publishing: Get help with self-publishing your book to Amazon's Kindle Store; Retrieved from https://kdp.amazon.com/en_US/help/topic/AIEDQZJ8TVWZX on Aug. 7, 2017; 2 pgs.

*Primary Examiner* — Quoc A Tran
(74) *Attorney, Agent, or Firm* — K&L Gates LLP (57) ABSTRACT

Systems and methods for digital content editing and assessment are described. Software tools may perform heuristic processing of the digital content, producing computer-generated edits to the digital content. In addition, a user may accept, reject, or modify these computer-generated edits, and/or make additional edits to other portions of the digital content. The digital content may be subjected to additional processing steps prior to completion or publication. Various metrics associated with the editing of the digital content may be stored and analyzed to evaluate the performance of the digital content editing. This evaluation may be used to make changes to the editing process, such as to refine the detection heuristics for automated editing or modify other processes of the editing workflow.

19 Claims, 8 Drawing Sheets

(56) References Cited

U.S. PATENT DOCUMENTS

| | | |
|---|---|---|
| 9,336,185 B1 | 5/2016 | Kumar et al. |
| 9,349,202 B1 | 5/2016 | Manohar et al. |
| 9,372,592 B1 | 6/2016 | Goodspeed et al. |
| 9,424,249 B1 | 8/2016 | Grigsby et al. |
| 9,514,120 B1 | 12/2016 | Chen et al. |
| 2002/0083103 A1* | 6/2002 | Ballance ................. G06F 40/58 715/264 |
| 2004/0030995 A1 | 2/2004 | Bhogal et al. |
| 2008/0134025 A1* | 6/2008 | Harada ................. G06F 40/197 715/255 |
| 2014/0344264 A1* | 11/2014 | Kenna ............... G06F 16/90328 707/731 |

\* cited by examiner

The Wonderful Wizard of Oz

By Lyman Frank Baum

Chapter 1

The Cyclone

Dorothy lived in the midst of the great Kansas prairies, with Uncle Henry, who was a farmer, and Aunt Em, who was the farmer's wife. Their house was small, for the lumber to build it had to be carried by wagon many miles. There were four walls, a floor and a roof, which made one room; and this room contained a rusty looking cookstove, a cupboard for the dishes, a table, three or four chairs, and the beds.

Uncle Henry and Aunt Em had a big bed in one corner, and Dorothy a little bed in another corner. There was no garret at all, and no cellar—except a small hole dug in the ground, called a cyclone cellar, where the family could go in case one of those great whirlwinds arose, mighty enough to crush any building in its path. It was reached by a trap door in the middle of the floor, from which a ladder led down into the small, dark hole.

The Wonderful Wizard of Oz 310b

→ By Lyman Frank Baum

312a

CHAPTER 1

→ *The Cyclone*

314b

Dorothy lived in the midst of the great Kansas prairies, with Uncle Henry, who was a farmer, and Aunt Em, who was the farmer's wife. Their house was small, for the lumber to build it had to be carried by wagon many miles. There were four walls, a floor and a roof, which made one room; and this room contained a rusty looking cookstove, a cupboard for the dishes, a table, three or four chairs, and the beds.

Uncle Henry and Aunt Em had a big bed in one corner, and Dorothy a little bed in another corner. There was no garret at all, and no cellar—except a small hole dug in the ground, called a cyclone cellar, where the family could go in case one of those great whirlwinds arose, mighty enough to crush any building in its path. It was reached by a trap door in the middle of the floor, from which a ladder led down into the small, dark hole.

<TITLE><AUTOEDIT>The Wonderful Wizard of Oz</TITLE> 320b

<AUTHOR><AUTOEDIT>By Lyman Frank Baum</AUTHOR>

<CHP_TITLE><AUTOEDIT>Chapter 1</CHPTITLE>  325a

<CHP_SUBTITLE><AUTOEDIT><MANUALEDIT>The Cyclone</CHP_SUBTITLE>

<PARAGRAPH><AUTOEDIT><DROP_CAP>D</DROP_CAP>orothy lived in the midst of the great Kansas prairies, with Uncle Henry, who was a farmer, and Aunt Em, who was the farmer's wife. Their house was small, for the lumber to build it had to be carried by wagon many miles. There were four walls, a floor and a roof, which made one room; and this room contained a rusty looking cookstove, a cupboard for the dishes, a table, three or four chairs, and the beds.</PARAGRAPH>

<PARAGRAPH><AUTOEDIT>Uncle Henry and Aunt Em had a big bed in one corner, and Dorothy a little bed in another corner. There was no garret at all, and no cellar—except a small hole dug in the ground, called a cyclone cellar, where the family could go in case one of those great whirlwinds arose, mighty enough to crush any building in its path. It was reached by a trap door in the middle of the floor, from which a ladder led down into the small, dark hole.</PARAGRAPH>

FIG. 3E

The Wonderful Wizard of Oz                    310c

By L. Frank Baum
312b

CHAPTER 1

*The Cyclone*

Dorothy lived in the midst of the great Kansas prairies, with Uncle Henry, who was a farmer, and Aunt Em, who was the farmer's wife. Their house was small, for the lumber to build it had to be carried by wagon many miles. There were four walls, a floor and a roof, which made one room; and this room contained a rusty looking cookstove, a cupboard for the dishes, a table, three or four chairs, and the beds.

Uncle Henry and Aunt Em had a big bed in one corner, and Dorothy a little bed in another corner. There was no garret at all, and no cellar—except a small hole dug in the ground, called a cyclone cellar, where the family could go in case one of those great whirlwinds arose, mighty enough to crush any building in its path. It was reached by a trap door in the middle of the floor, from which a ladder led down into the small, dark hole.

<TITLE><AUTOEDIT>The Wonderful Wizard of Oz</TITLE>                    320c <AUTHOR><AUTOEDIT><MANUALEDIT>By L. Frank Baum</AUTHOR>

<CHP_TITLE><AUTOEDIT>Chapter 1</CHPTITLE>

<CHP_SUBTITLE><AUTOEDIT>The Cyclone</CHP_SUBTITLE>

<PARAGRAPH><AUTOEDIT><DROP_CAP>D</DROP_CAP>orothy lived in the midst of the great Kansas prairies, with Uncle Henry, who was a farmer, and Aunt Em, who was the farmer's wife. Their house was small, for the lumber to build it had to be carried by wagon many miles. There were four walls, a floor and a roof, which made one room; and this room contained a rusty looking cookstove, a cupboard for the dishes, a table, three or four chairs, and the beds.</PARAGRAPH>

<PARAGRAPH><AUTOEDIT>Uncle Henry and Aunt Em had a big bed in one corner, and Dorothy a little bed in another corner. There was no garret at all, and no cellar—except a small hole dug in the ground, called a cyclone cellar, where the family could go in case one of those great whirlwinds arose, mighty enough to crush any building in its path. It was reached by a trap door in the middle of the floor, from which a ladder led down into the small, dark hole.</PARAGRAPH>

DIGITAL CONTENT EDITING AND PUBLICATION TOOLS

BACKGROUND

Software applications may be used to edit digital content for conversion into different formats, display on different computing devices, or to revise the content itself. For example, a user may compose a book using a desktop computer word processing application, but the resulting word processing file is not immediately usable for publishing the book in hardcover, paperback, or electronic book ("e-book") form, because the formatting, pagination, and other aspects of the book when rendered in the word processing application are not in desirable form for those types of publication. In some cases, a user may manually edit the media content using a software application. In other cases, some of the editing and/or conversion operations may be completed using computer-implemented automated editing processes. For example, editing software may be used to automatically identify chapter and section names within a document, and then generate a Table of Contents based on those detected chapter and section names.

One disadvantage of the use of these automated editing processes is that they are imperfect and may misidentify certain portions of text as a section name or fail to detect a chapter name. The user may then manually review the automated edits and manually edit the document to properly identify the chapter and section names.

BRIEF DESCRIPTION OF DRAWINGS

FIGS. 3A-3G illustrate media content in different stages of editing, in accordance with embodiments of the present invention.

DETAILED DESCRIPTION

In the following description, reference is made to the accompanying drawings, which illustrate several embodiments of the present invention. It is understood that other embodiments may be utilized and mechanical, compositional, structural, electrical, and operational changes may be made without departing from the spirit and scope of the present disclosure. The following detailed description is not to be taken in a limiting sense, and the scope of the embodiments of the present invention is defined only by the claims of the issued patent.

Various embodiments of the present disclosure provide improved systems and methods for digital content editing and assessment. Software tools may perform heuristic processing of the digital content, producing computer-generated edits to the digital content. In addition, a user may accept, reject, or modify these computer-generated edits, and/or make additional edits to other portions of the digital content. The digital content may be subjected to additional processing steps prior to completion or publication. In accordance with embodiments of the present invention, various metrics associated with the editing of the digital content may be stored and analyzed to evaluate the performance of the digital content editing. This evaluation may be used to make changes to the editing process, such as to refine the detection heuristics for automated editing or modify other processes of the editing workflow.

Figure 1:
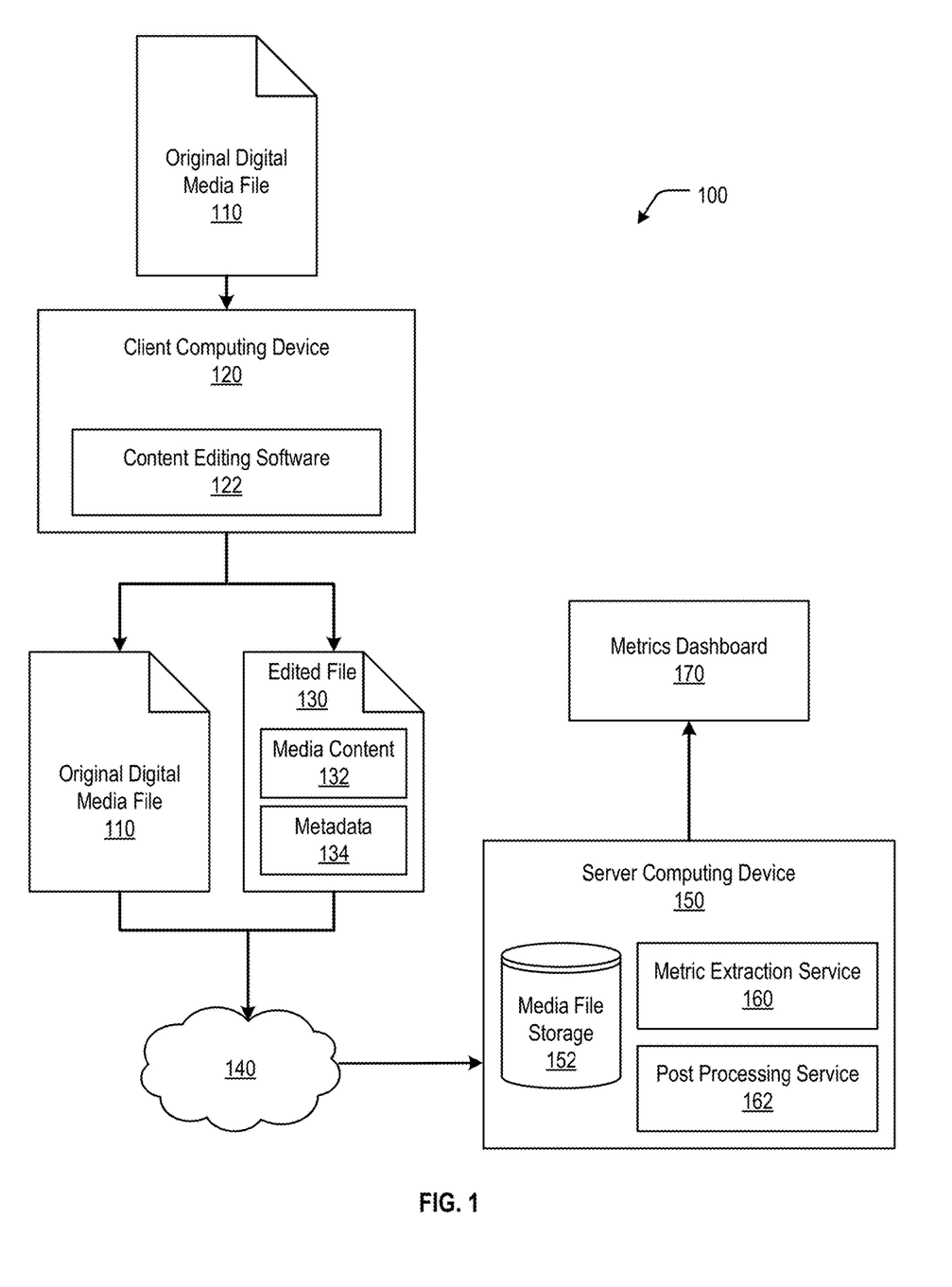
FIG. 1 is an illustrative block diagram of a system for digital content editing and assessment, in accordance with embodiments of the present invention.

FIG. 1 is an illustrative block diagram of a system 100 for digital content editing and assessment, in accordance with embodiments of the present invention. A user is operating content editing software 122 running on client computing device 120 in order to produce a digital media file for publication, such as, e.g., an electronic book ("e-book") for digital publication on an online e-book service. The user may begin with an original digital media file 110, which could be, for example, a word processing file containing media content (e.g., the text of the e-book). The content editing software 122 provides a file import function which the user may utilize in order to import the original digital media file 110 for editing by the content editing software 122.

In some embodiments, the content editing software 122 comprises dedicated desktop software operating on the user's desktop computer or a software plug-in for the user's word processing software application. In these embodiments, subsequent editing processes may be performed by the content editing software 122 on a digital file stored locally on the client computing device 120. In other embodiments, the content editing software 122 may be a cloud-based software application that is being executed on a remote server computer with a user interface displayed on the client computing device 120, e.g., via a browser application. In these embodiments, the file import function transmits the original digital media file 110 to the remote server computer and subsequent editing processes may be performed by the content editing software 122 on a digital file stored remotely on the server computer.

The user may utilize the content editing software 122 to perform various content editing operations, as will be described in greater detail below. In some cases, the content editing software 122 may execute a heuristic processing analysis of the media content in which certain editing functions are automatically performed based on a set of heuristics (e.g., one or more rules, preferences, priorities, models, etc.) to produce an edited digital media file 130. In some cases, the user may review the automatically generated edits to accept the edits which are desired and reject the edits which are not. In addition, the user may manually make additional edits to the media content, such as to apply style format operations on one or more portions of the media content or to make substantive edits to the media content (e.g., to add or delete content).

After the user completes the desired editing operations, the user may publish the media content. As part of this publication, the content editing software 122 may generate an edited digital media file 130 which includes media content 132 and metadata 134 associated with the media content 132. This metadata 134 may include information regarding the content editing operations performed by the content editing software 122. This information can be used to generate and evaluate metrics associated with the content editing software 122, as will be described in greater detail below. The content editing software 122 may then transmit the edited digital media file 130 along with the original digital media file 110 to a remote server computing device 150 via one or more networks 140, e.g., one or more local area networks (LAN) and/or wide area networks (WAN), such as the Internet.

The server computing device 150 may provide a metric extraction service 160 which extracts and analyzes metrics from the metadata 134 in the edited digital media file 130 along with the original digital media file 110. This analysis can provide useful information about the performance and the user's utilization of the content editing software 122, as will be described in greater detail below.

The server computing device 150 may also include a media file storage 152 storing a plurality of edited digital media files and their associated original digital media files received from a variety of sources (e.g., a plurality of users operating the content editing software 122 on their respective computing devices). The metric extraction service 160 may extract and analyze collective metrics from this collection of edited and original digital media files, as will be described in greater detail below.

In some embodiments, the server computing device 150 may include a post processing service 162 that can perform additional processing operations on the edited digital media files after the user has completed the desired editing operations with the content editing software 122 and published the digital media file. For example, various optimizations may be applied to the edited digital media file for improved display on different types of computing devices, e.g., image downscaling, conversion to different media formats, and font optimizations. In some embodiments, the optimizations may be performed manually by a human reviewer to, e.g., edit the content for grammatical or spelling errors. The metric extraction service 160 may extract and analyze collective metrics related to the post-publication processing, as will be described in greater detail below.

The output of the metric extraction service 160, e.g., one or more of the extracted metrics and associated analysis, may be displayed on a metrics dashboard 170 for review. The metrics dashboard 170 may be displayed in any desired format and could be, e.g., a user interface displayed in a browser application operating on a remote quality assurance engineer's computing device.

Figure 2:
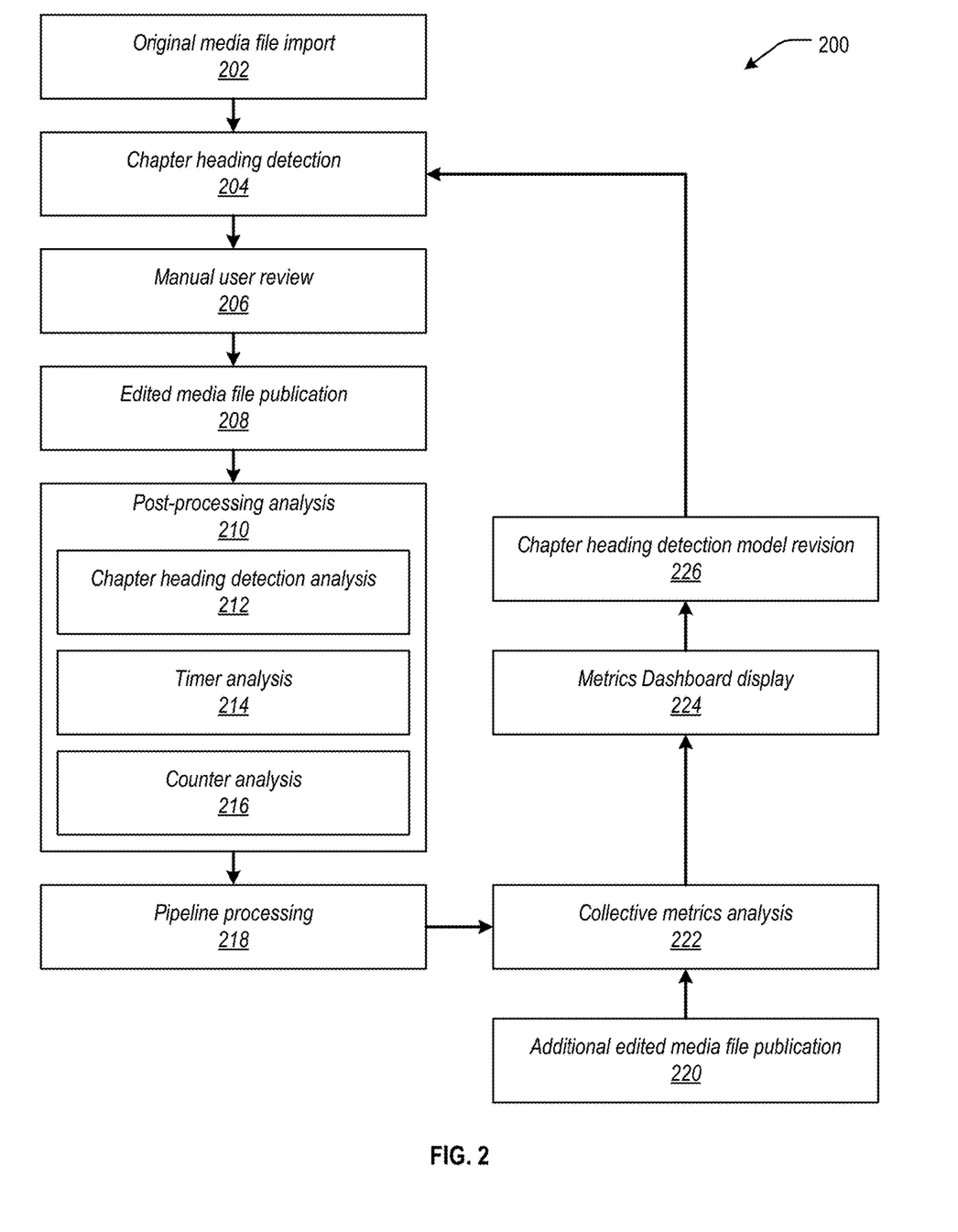
FIG. 2 is a flowchart illustrating a method of digital content editing and assessment, in accordance with embodiments of the present invention.

FIG. 2 is a flowchart illustrating a method 200 of digital content editing and assessment, in accordance with embodiments of the present invention. In this example, the content editing software 122 is an e-book authoring tool running on the user's computing device. In step 202, the user imports into the e-book authoring tool an original digital media file created using a desktop computer word processing application. In some embodiments, the e-book authoring tool converts the media file from the word processing application's file format to a different file format, such as a file format designed for e-book publication. The edited file may then be stored locally on a non-transitory computer-readable memory of the user's computing device or may be stored on a non-transitory computer-readable memory of a remote server computing device accessed via a wide area network.

In step 204, an automatic editing operation is performed on the converted digital media file. Any desired automatic editing operation may be used and the operation may be initiated using any of a variety of methods. In the illustrated example, the automatic editing operation is an automatic chapter heading detection operation that is initiated when the user, when interacting with a graphical user interface (GUI) of the e-book authoring tool, selects a user interface (UI) element labelled "Chapter Heading Detection." During this automatic chapter heading detection operation, the e-book authoring tool performs a computer-executed heuristic processing analysis of the media content in which a set of heuristics is applied to identify the portions of the text that are likely to correspond to chapter headings in the e-book. After these portions of text are identified, they are formatted as chapter title headings. The metadata of the converted digital media file is updated with a tag associated with the identified portion of text and indicating that the chapter title style format designation was automatically applied.

In some embodiments, additional or alternative automatic editing operations may be performed, such as, for example, the automatic identifying and formatting of chapter numbers and/or subtitles, dedication portions, bullets, lists, tables, special fonts, and/or application of a style theme to the converted digital media file in which a set of style rules are applied throughout a e-book in a user-selected style.

In step 206, the human user may interact with the GUI of the e-book authoring tool to review the changes made during the automatic chapter heading detection operation (or other automatic editing operation). In some cases, the computer-executed heuristic processing analysis of the media content may improperly misidentify a portion of the text as being a chapter title. This manual user review enables the user to review each of the changes made by the e-book authoring tool in step 204, and then accept or reject each change. This may be accomplished by displaying each automatically styled portion of text to the user and presenting an "Accept" or "Reject" button for selection by the user. If the user rejects one of the automatically identified chapter headings, another tag may be associated with that portion of text indicating that the automatic chapter title style format designation was manually overridden by the user. It may be desirable to maintain the original tag indicating that the chapter title style format designation was automatically applied to that text during the automatic chapter heading detection operation. As will be described in greater detail below, the retention of both the original automatic-edit tag along with the subsequent manual-edit tag can facilitate later analysis of the performance of the automatic chapter heading detection operation, and possibly inform changes to the heuristic processing analysis.

In other cases, the computer-executed heuristic processing analysis of the media content may fail to identify text that should have been formatted as chapter titles. During the manual user review, the user may manually select portions of text that were missed during the automatic chapter heading detection operation and apply the chapter title style format designation to those portions. In addition to updating the style format associated with that text, a manual-edit tag may also be associated with that text in order to indicate the origin of that edit. In these cases, there would be no automatic-edit tag associated with that text because the text had not been identified as likely chapter headings by the heuristic processing analysis.

After the user has completed the manual review of the edited media content and is satisfied that the formatting of the e-book is complete, in step 208, the user approves the edited media file for publication. During this publication step, the edited digital media file, including the media content and associated metadata, is uploaded from the user's computing device to the server computing device 150. During publication, various operations are performed in order to make the e-book available for distribution and display to readers. For example, the edited digital media file may be converted into a variety of formats for display on specific devices. In addition, information about the media content may be added to a publication catalog, e.g., a database for an online e-book distribution, lending, and/or sales website.

After the edited digital media file is published, a post-processing analysis 210 may be performed on the edited digital media file in which various metrics about the editing and formatting of the media content that were performed by the authoring tool at the user's computing device can be analyzed for display to and assessment by a quality control engineer responsible for the e-book authoring tool.

One example post-processing analysis that may be performed is a chapter heading detection analysis 212, in which the performance of the e-book authoring tool's automatic chapter heading detection is assessed. This may be accomplished by a computer-executed review of the automatic-edit and manual-edit tags contained in the metadata of the edited digital media file. In one embodiment, the performance may be assessed using two metrics: yield and accuracy.

The yield metric may be computed as the percentage of chapter titles that were correctly identified during the automatic chapter heading detection operation out of all of the chapter titles that were identified during the automatic chapter heading detection operation. For example, if 20 portions of text were identified as likely chapter headings, but the user during the manual user review rejected 4 of those automatically-identified portions, the yield would be 80%.

The accuracy metric may be computed as the percentage of chapter titles that were correctly identified during the automatic chapter heading detection operation out of all of the chapter titles are designated in the final, published e-book. Using the example above, 20 portions of text were identified as likely chapter headings, but the user during the manual user review rejected 4 of those automatically-identified portions. Therefore, 16 chapter titles were correctly identified during the automatic chapter heading detection operation. If the user during the manual user review identified an additional 2 chapter titles that had not been identified during the automatic chapter heading detection operation, the total number of chapter titles would be 18, so the accuracy would be 88.9%.

The use of metadata tags to identify the automatic and manual edits can provide a number of advantages. In some cases, a user may make multiple changes to the same portion of text, e.g., to accept the automatic chapter heading formatting, and then later to reject the formatting, and then later to undo that change to revert the text back to a chapter heading. These changes may occur during the same editing session or may occur over multiple editing sessions during which multiple instantiations of the e-book authoring tool software are executed on the user's computing device or on different computing devices operated by the user. In this situation, it may be challenging to maintain an accurate record of the multiple edits made to the same portion of text. If the multiple changes are all saved in volatile memory by the authoring tool software, then those changes would be lost after that instantiation of the software is terminated. It may be possible to save those changes to persistent memory, but the logic of storing and continually updating those changes can be programmatically burdensome. The use of tags as described above can facilitate a simpler method of recording these edits by recording only a limited number of tags, e.g., up to two tags: a first automatic-edit tag if the portion of text is automatically identified and formatted, and a second manual-edit tag if the portion of text is manually identified and formatted. Therefore, when the authoring tool software automatically identifies a portion of text as a chapter heading, a first automatic-edit tag may be added. Then, if a user later overrides the automatic identification of a chapter heading, a manual-edit tag can be added, while retaining the original automatic-edit tag. A subsequent review of the metadata would quickly identify that portion of text as having been erroneously identified during the chapter heading detection operation as a chapter heading. However, if the user later performs an "undo" operation to reverse the manual editing removal of the chapter heading style format, then the manual-edit tag can be removed, while retaining only the original automatic-edit tag. A subsequent review of the metadata would quickly identify that portion of text as having been automatically identified as a chapter heading and approved by the user. Because the user's initial rejection of the change and later reversal of that rejection is irrelevant to an analysis of the performance of the automatic chapter heading detection operation, it is not necessary to retain any metadata reflecting that temporary change, thereby reducing the amount of storage required to save the additional irrelevant metadata while still enabling the desired performance metrics.

In other embodiments, the post-processing analysis 210 can be used to analyze other style-related metrics. For example, the authoring tool may provide users with a plurality of style format options, but a user may only use a smaller subset of the available style format options when editing the e-book. In this case, the post-processing analysis may include a review of the metadata to identify any style formats or other content elements that were available on the tool but were not utilized in a particular e-book.

Another example post-processing analysis that may be performed is a timer analysis 214, in which the time elapsed for in the performance of any of a variety of operations is analyzed. In one example, a "Book Open" metric may be recorded by the authoring tool software to record the time elapsed from the moment the user selects a book in the UI of the authoring tool software to when the first page of the e-book is displayed along with a set of thumbnail images of the other pages in the e-book. In another example, a "Book Create" metric may be recorded by the authoring tool software to record the time elapsed from the moment the user selects the e-book's word processing file for conversion by the authoring tool software into the desired e-book publication file format, to when the converted e-book is displayed to the user. In another example, an "Application Session Length" metric may be recorded by the authoring tool software to record the total amount of time spent by the user editing the e-book with the authoring tool. In other examples, any desired timer-based metric may be recorded, such as, e.g., the time elapsed to import the original media file 110 into the content editing software 122 or the time spent by the user adding multimedia, interactive, or other elements to the media content. In some embodiments, one or more of the timer metrics may be stored as part of the metadata 134 associated with each edited media file 130. In other embodiments, the metrics may be stored in a database of the authoring tool software and later transmitted to the server computing device 150 for analysis.

Another example post-processing analysis that may be performed is a counter analysis 216, in which the number of times a particular action has been performed. Some example counter metrics that may be recorded by the authoring software includes: the number of times the authoring software application is launched over the course of the editing of a single e-book or during a prescribed period of time; the number of "undo" actions taken by the user during the editing process; the number of "redo" actions taken by the user during the editing process; the number of e-book pages moved, added, and/or deleted; and the number of multimedia and/or interactive elements (e.g., "plugins") moved, added, and/or deleted from the media content.

In addition to the post-processing analysis that may be performed to assess metrics relating to the operation of the authoring tool software on the user's computing device, a pipeline processing analysis 218 may be performed to assess metrics relating to additional pipeline processing steps that are performed on the digital content after the digital media file is uploaded to the server computing device for publication. For example, images contained in the digital media file may be later optimized by the server computing device for transmission and/or display to different types of devices. The amount of image optimization performed may be recorded as one of the pipeline metrics. These metrics may be generated by a human quality control operator performing a manual quality review of the edited media file 130. For example, the quality control operator may review the edited media file 130 to determine whether one or more predetermined characteristics of the edited media file 130 are correct. These characteristics could include, e.g., whether the table of contents, the navigation links, the line spacing, the line justification, and the fonts are correct. In some cases, the manual review may include a comparison of the original digital media file 110 with the edited media file 130. In other embodiments, one or more aspects of the quality review may be computer-performed without human review.

The server computing device may receive edited digital media files from multiple sources in 220, including different users operating different computing devices. In addition to the analysis performed on each individual e-book as described above, a collective metrics analysis 222 may be performed on a collection of multiple media files to assess the overall performance of the authoring tool. For example, one metric may relate to the user's choice of e-book layout format, e.g., the number of e-books in reflowable format (in which the layout of the content may vary depending on the device and/or application used to view the content) compared to the number of e-books in fixed-layout format (in which the layout of the content is fixed). Other example metrics include: the number of books published using one of a set of available e-book style themes, which define one or more stylistic or formatting characteristics of the e-book that can be automatically applied upon selection of that theme; the number of crashes or other computing errors of the content editing software 122 during a period of time; the number of e-books utilizing drop caps formatting; and the number of e-book having automatically generated tables of contents.

After the metrics analyses are complete, these analyses may be compiled into a metrics dashboard 170 for display in step 224 to a software developer, quality control engineers, or other personnel responsible for the authoring tool. The metrics dashboard 170 facilitates the easy review and assessment of the tool's performance, and can enable identification of opportunities to improve the heuristic processing models, available style formats, available features, or other aspects of the authoring tool.

In step 226, a software developer may utilize the information displayed on the metrics dashboard 170 to modify the authoring tool, such as, e.g., by revising the chapter heading detection heuristic model, removing features or style formats, adding features or style formats, or other changes to the feature set of the authoring tool.

Figure 3A:
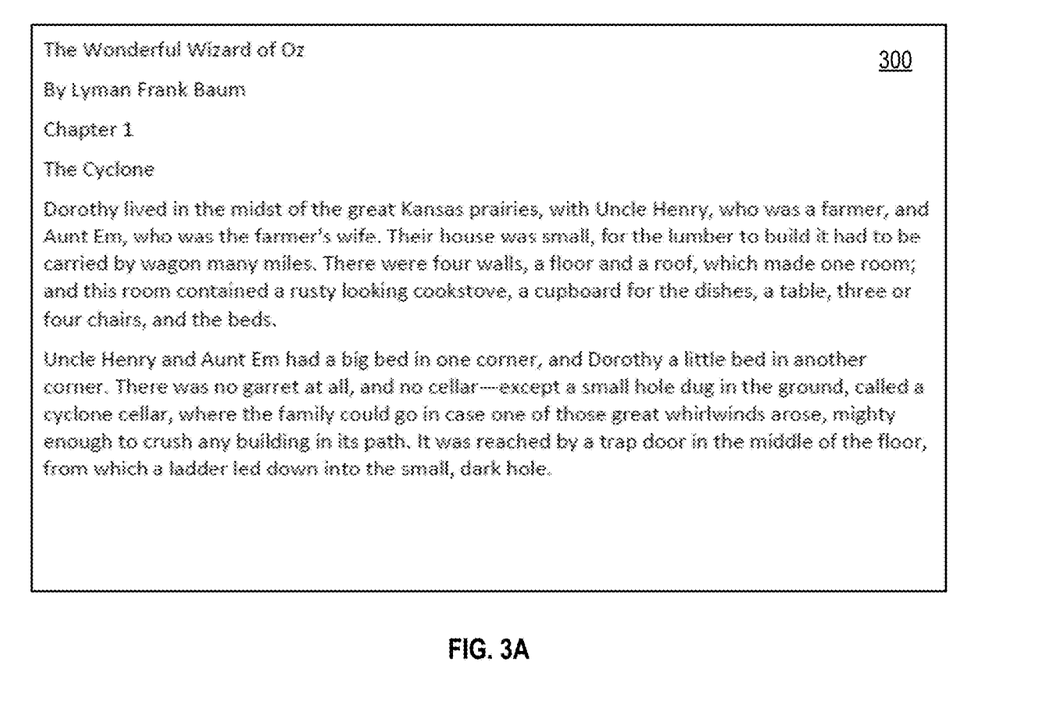

FIGS. 3A-3G provide simplified illustrations of media content in different stages of editing, in accordance with embodiments of the present invention. FIG. 3A illustrates a portion of the media content 300 of an original digital media file that a user may import into the authoring tool as described above. In this example, the media content 300 comprises text with no formatting applied.

Figure 3B:
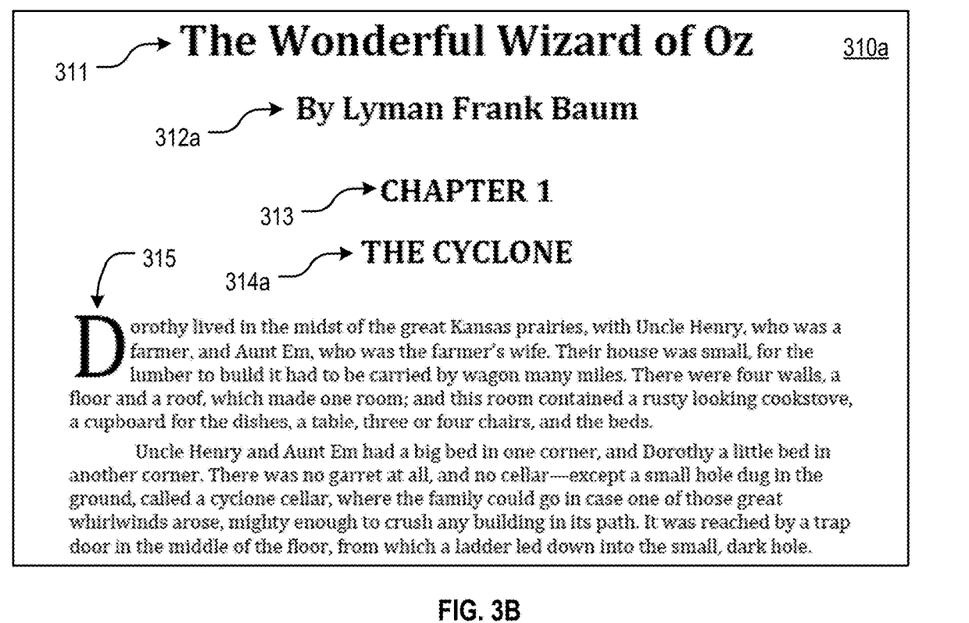
Figure 3C:
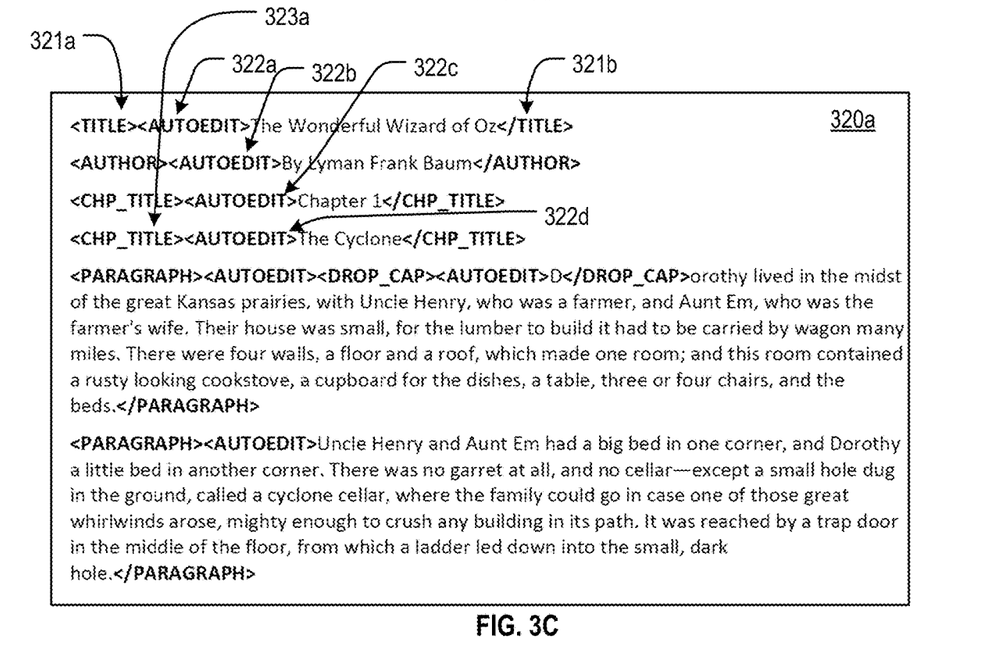

FIG. 3B illustrates a portion of the formatted media content 310a that results after an automatic formatting process is performed on the original digital media file. FIG. 3C is a simplified illustration 320a of media content with metadata tags corresponding to the formatted media content 310a depicted in FIG. 3B.

In the formatted media content 310a, the first line 311 of text "The Wonderful Wizard of Oz" has been automatically identified by the automatic heading detection process as the title of the e-book and a title style format is applied. As can be seen in FIG. 3C, this automatic title style format results in the addition of a <TITLE> tags 321a-321b and <AUTOEDIT> tag 322a to the text corresponding to "The Wonderful Wizard of Oz". The <TITLE> tags 321a-321b indicate that the portion of text contained between the <TITLE> tag 321a and </TITLE> tag 321b is associated with the title style format. The <AUTOEDIT> tag 322a contained between the <TITLE> tag 321a and </TITLE> tag 321b indicates that the title style format was automatically applied by the authoring tool.

The second line 312a of text "By Lyman Frank Baum" has been automatically identified as the author of the e-book and an author name style format has been applied in FIG. 3B. Similarly, in FIG. 3C, metadata tags <AUTHOR> and <AUTOEDIT> are associated with the text "By Lyman Frank Baum" to indicate the style format that has been applied and the source of that formatting (e.g., automatic detection).

The third line 313 and fourth line 314a of text "CHAPTER 1" and "THE CYCLONE" have been automatically identified as chapter titles, so a chapter title style format has been applied in FIG. 3B. In this example, in addition to modification of the font size and bold formatting, the text has been converted from "Chapter 1" and "The Cyclone" in the original media content 300 to an all caps "CHAPTER 1" and "THE CYCLONE" in the automatically formatted text. As shown in FIG. 3C, metadata <CHP_TITLE> tags and <AUTOEDIT> tags 322c-322d are associated with the text "CHAPTER 1" and "THE CYCLONE" to indicate the chapter title style format that has been applied and the source of that formatting (e.g., automatic detection).

The remaining portion of text has been identified as the body of the chapter, so a standard body paragraph style format has been applied. In addition, the style theme applied to this media content provides that the first letter 315 of the body of each chapter is displayed in drop caps. As shown in FIG. 3C, metadata tags <PARAGRAPH> and <AUTOEDIT> are associated with the body of the text to indicate that the paragraph style format that has been automatically applied, and <DROP_CAP> and <AUTOEDIT> are associated with the letter "D" to indicate the automatic application of the drop cap style.

After the automatic detection and formatting process is completed, the user may manually review the changes and make any desired edits. In some cases, the edits are to reject automatically applied edits, while in other cases, the edits are to make a different style or substance change to the media content.

FIGS. 3D-3E illustrate a portion of the formatted media content 310b that results after the user changes the automatic chapter title style in the fourth line 314a of formatted media content 310a to a chapter subtitle style 314b. FIG. 3E is a simplified illustration 320b of media content with updated metadata tags corresponding to the changes made by the user. As shown in FIG. 3E, the <CHP_TITLE> tag 323a associated with "The Cyclone" has been replaced with a <CHP SUBTITLE> tag 324 to reflect the revised style format applied to the text, and a <MANUALEDIT> tag 325a has been added after the <AUTOEDIT> tag 322d to reflect that the text had originally been automatically formatted but was subsequently manually edited to the chapter subtitle format.

FIGS. 3F-3G illustrate a portion of the formatted media content 310c that results after the user makes a substantive change to the text of the file. As shown in FIG. 3F, the second line of text has been changed from the second line 312a "By Lyman Frank Baum" in FIGS. 3B and 3D to second line 312b "By L. Frank Baum" in FIG. 3F. As shown in FIG. 3G, a <MANUALEDIT> tag 325b has been associated with the text "L. Frank Baum" to indicate that the text had been manually edited by the user using the authoring tool.

It is to be understood that the tags illustrated in FIGS. 3A-3G are merely illustrative examples and that the metadata relating to the editing and/or formatting of the media content may be stored in any desired format. For example, in the illustrated embodiments, different tags may be used to indicate different types of formatting and content changes. In other embodiments, the tags need not specifically identify the type of formatting and/or content changes made. Instead, the type of formatting and/content changes may be determined based upon a comparison of the original media file 110 to the edited media file 130.

Figure 4A:
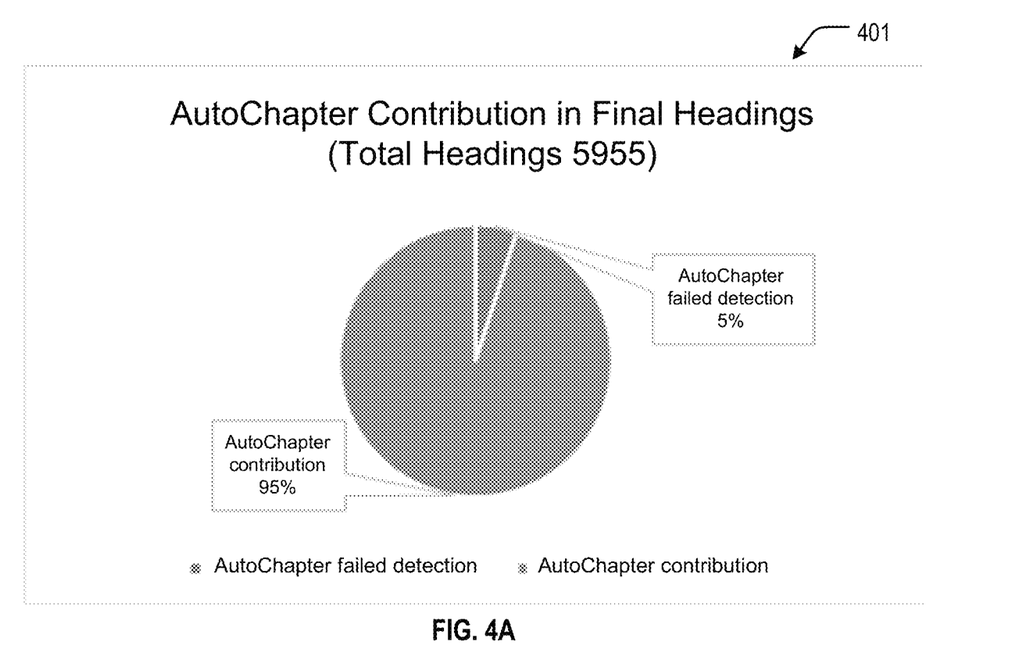
FIGS. 4A-4B illustrate example metrics dashboard displays, in accordance with embodiments of the present invention.
Figure 4B:
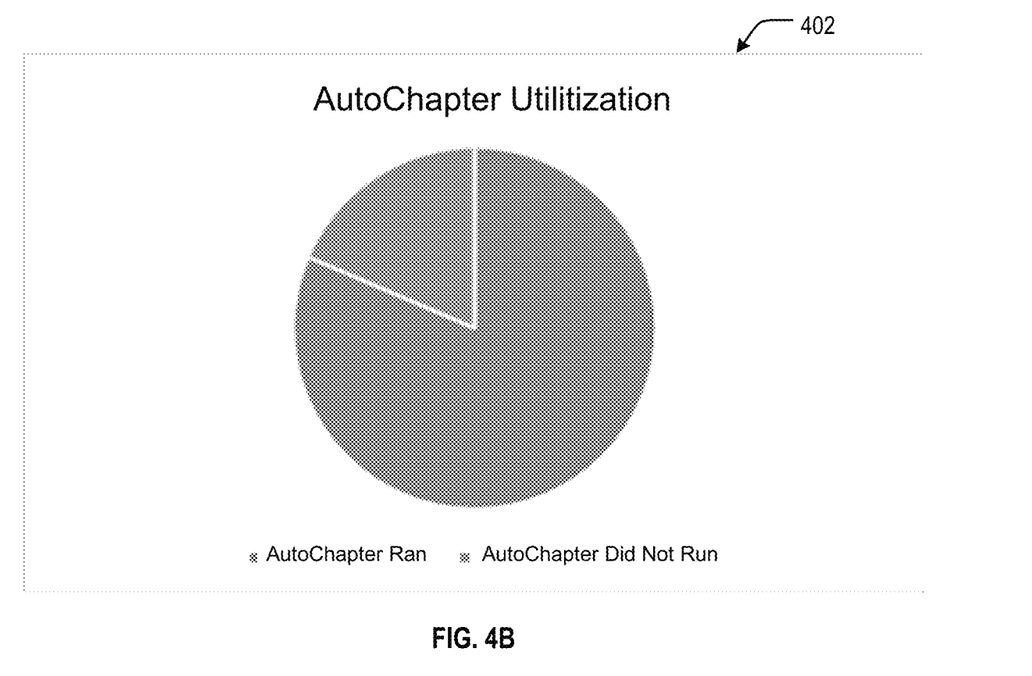

FIGS. 4A-4B illustrate example pages 401-402 that may be presented in a metrics dashboard 170 in accordance with embodiments of the present invention. In FIG. 4A, the metrics dashboard page 401 depicts the accuracy of the automatic chapter detection process. In this example, 95% of the chapter headings were accurately predicted by the authoring tool, while 5% of the chapter headings were not detected. This example illustrates collective metrics of a collection of e-books containing a total of 5955 chapter headings. In other examples, the metrics dashboard may present the accuracy for a single e-book, or for a collection of e-books from a particular author, particular subject matter, or particular style. In FIG. 4B, the metrics dashboard page 402 depicts the number of e-books for which the user chose to utilize the automatic chapter detection feature. It will be understood that in other embodiments, any of a variety of metrics may be presented in any desired format.

Figure 5:
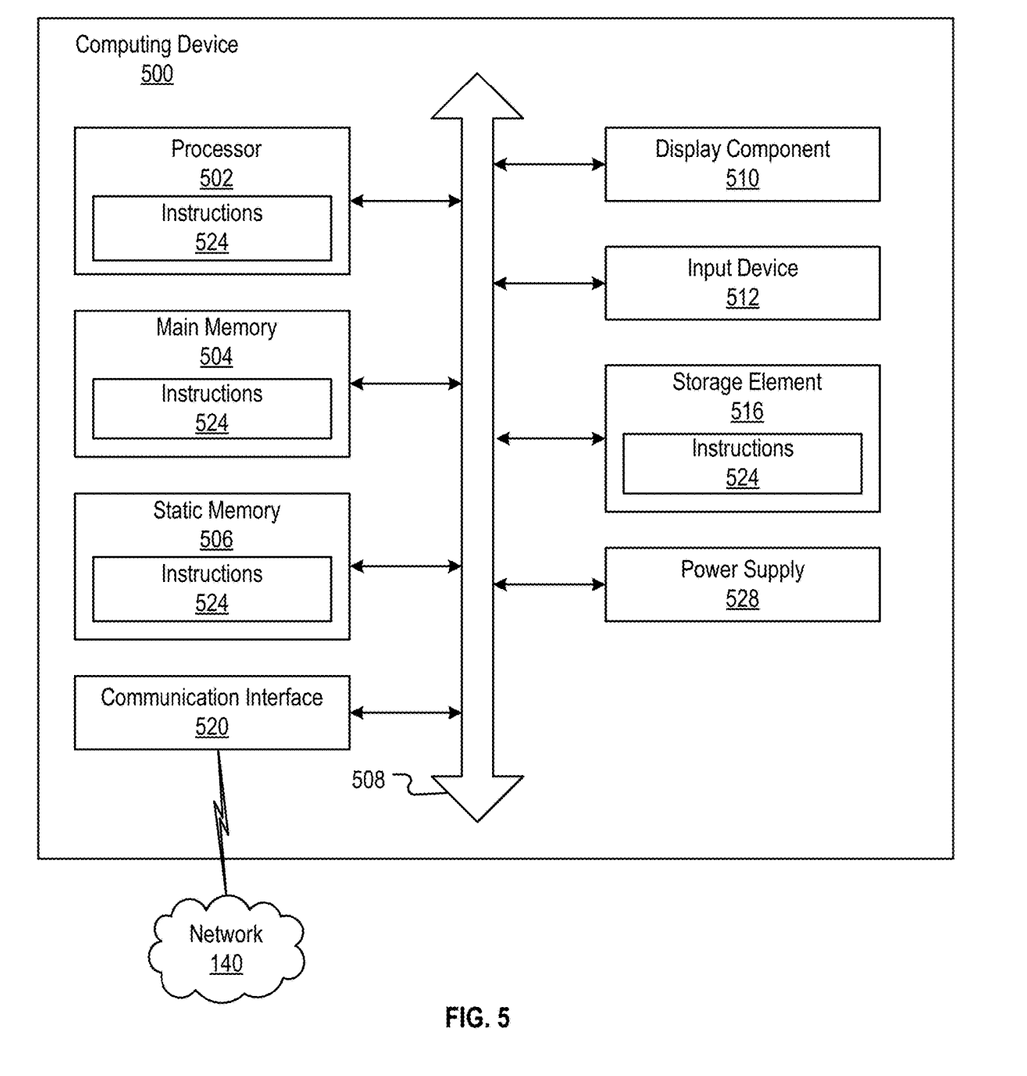
FIG. 5 is a block diagram illustrating components of an example computing device.

Referring to FIG. 5, the block diagram illustrates components of a computing device 500, according to some example embodiments, able to read instructions 524 from a non-transitory machine-readable storage medium (e.g., a hard drive storage system) and perform any one or more of the methodologies discussed herein, in whole or in part. Specifically, FIG. 5 shows the computing device 500 in the example form of a computer system within which the instructions 524 (e.g., software, a program, an application, an applet, an app, or other executable code) for causing the computing device 500 to perform any one or more of the methodologies discussed herein may be executed, in whole or in part.

In alternative embodiments, the computing device 500 operates as a standalone device or may be connected (e.g., networked) to other computing devices. In a networked deployment, the computing device 500 may operate in the capacity of a server computing device or a client computing device in a server-client network environment, or as a peer computing device in a distributed (e.g., peer-to-peer) network environment. The computing device 500 may include hardware, software, or combinations thereof, and may, as example, be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any computing device capable of executing the instructions 524, sequentially or otherwise, that specify actions to be taken by that computing device. Further, while only a single computing device 500 is illustrated, the term "computing device" shall also be taken to include any collection of computing devices that individually or jointly execute the instructions 524 to perform all or part of any one or more of the methodologies discussed herein.

The computing device 500 includes a processor 502 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 504, and a static memory 506, which are configured to communicate with each other via a bus 508. The processor 502 may contain microcircuits that are configurable, temporarily or permanently, by some or all of the instructions 524 such that the processor 502 is configurable to perform any one or more of the methodologies described herein, in whole or in part. For example, a set of one or more microcircuits of the processor 502 may be configurable to execute one or more modules (e.g., software modules) described herein.

The computing device 500 may further include a display component 510. The display component 510 may comprise, for example, one or more devices such as cathode ray tubes (CRTs), liquid crystal display (LCD) screens, gas plasma-based flat panel displays, LCD projectors, or other types of display devices.

The computing device 500 may include one or more input devices 512 operable to receive inputs from a user. The input devices 512 can include, for example, a push button, touch pad, touch screen, wheel, joystick, keyboard, mouse, trackball, keypad, accelerometer, light gun, game controller, or any other such device or element whereby a user can provide inputs to the computing device 500. These input devices 512 may be physically incorporated into the computing device 500 or operably coupled to the computing device 500 via wired or wireless interface. For computing devices with touchscreen displays, the input devices 512 can include a touch sensor that operates in conjunction with the display component 510 to permit users to interact with the image displayed by the display component 510 using touch inputs (e.g., with a finger or stylus).

The computing device 500 may also include at least one communication interface 520, comprising one or more wireless components operable to communicate with one or more separate devices within a communication range of the particular wireless protocol. The wireless protocol can be any appropriate protocol used to enable devices to communicate wirelessly, such as Bluetooth, cellular, IEEE 802.11, or infrared communications protocols, such as an IrDA-compliant protocol. It should be understood that the communication interface 520 may also or alternatively comprise one or more wired communications interfaces for coupling and communicating with other devices.

The computing device 500 may also include a power supply 528, such as, for example, a rechargeable battery operable to be recharged through conventional plug-in approaches or through other approaches, such as capacitive charging. Alternatively, the power supply 528 may comprise a power supply unit which converts AC power from the power grid to regulated DC power for the internal components of the device 500.

The computing device 500 may also include a storage element 516. The storage element 516 includes the machine-readable medium on which are stored the instructions 524 embodying any one or more of the methodologies or functions described herein. The instructions 524 may also reside, completely or at least partially, within the main memory 504, within the processor 502 (e.g., within the processor's cache memory), or both, before or during execution thereof by the computing device 500. The instructions 524 may also reside in the static memory 506.

Accordingly, the main memory 504 and the processor 502 may also be considered machine-readable media (e.g., tangible and non-transitory machine-readable media). The instructions 524 may be transmitted or received over a network 140 via the communication interface 520. For example, the communication interface 520 may communicate the instructions 524 using any one or more transfer protocols (e.g., HTTP).

The computing device 500 may be implemented as any of a number of electronic devices, such as a tablet computing device, a smartphone, a media player, a portable gaming device, a portable digital assistant, a laptop computer, or a desktop computer. In some example embodiments, the computing device 500 may have one or more additional input components (e.g., sensors or gauges) (not shown). Examples of such input components include an image input component (e.g., one or more cameras), an audio input component (e.g., a microphone), a direction input component (e.g., a compass), a location input component (e.g., a GPS receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a non-transitory machine-readable medium capable of storing data temporarily or permanently and may be taken to include, but not be limited to, random-access memory (RAM), read-only memory (ROM), buffer memory, flash memory, and cache memory. The machine-readable medium is non-transitory in that it does not embody a propagating signal. While the machine-readable medium is described in example embodiments as a single medium, the term "machine-readable medium" should be taken to include a single medium or multiple media (e.g., a centralized or distributed database, or associated caches and servers) able to store instructions 524. The term "machine-readable medium" shall also be taken to include any medium, or combination of multiple media, that is capable of storing the instructions 524 for execution by the computing device 500, such that the instructions 524, when executed by one or more processors of the computing device 500 (e.g., processor 502), cause the computing device 500 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

While the invention has been described in terms of particular embodiments and illustrative figures, those of ordinary skill in the art will recognize that the invention is not limited to the embodiments or figures described. For example, various embodiments described above relate to the automatic detection of chapter headings for e-books. In other embodiments, metrics may be stored and analyzed for any desired style formatting, content editing, or other editing operations in any desired media type.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, details of the invention may not be described in the specification or depicted in the drawings in more detail than is necessary to provide a fundamental understanding of the invention and make apparent to those of ordinary skill in the art how the several forms of the invention may be embodied in practice.

As used herein and unless otherwise indicated, the terms "a" and "an" are taken to mean "one," "at least one" or "one or more." Unless otherwise required by context, singular terms used herein shall include pluralities and plural terms shall include the singular.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural and singular number, respectively. Additionally, the words "herein," "above," and "below" and words of similar import, when used in this application, shall refer to this application as a whole and not to any particular portions of the application.

The description of embodiments of the disclosure is not intended to be exhaustive or to limit the disclosure to the precise form disclosed. While specific embodiments and examples for the disclosure are described herein for illustrative purposes, various equivalent modifications are possible within the scope of the disclosure, as those skilled in the relevant art will recognize. Such modifications may include, but are not limited to, changes in the dimensions and/or the materials shown in the disclosed embodiments.

Specific elements of any embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A method of assessing performance of an electronic book ("e-book") editing system, said method comprising:
receiving, by a host computing device, a plurality of original digital e-book files;
receiving, by the host computing device, a plurality of edited digital e-book files, wherein:
each of the edited digital e-book files is associated with a corresponding one of the plurality of original digital e-book files,
each of the edited digital e-book files comprises corresponding e-book content and corresponding metadata associated with the corresponding e-book content, and
for each of the edited digital e-book files, the corresponding metadata includes:
(i) a plurality of automatic edit operation tags, each automatic edit operation tag indicating a chapter title style format designation applied to a corresponding portion of the e-book content based on a computer-executed heuristic processing analysis of the e-book content, (ii) a plurality of manual edit operation tags, each manual edit operation tag indicating the chapter title style format designation applied to a corresponding portion of the e-book content based on a corresponding user input;
for a first edited digital e-book file of the plurality of edited digital e-book files, determining, by the host computing device, an automatically-determined chapter heading yield representing a total number of automatic edit operation tags not associated with one of the plurality of manual edit operation tags divided by the total number of automatic edit operation tags;
for the first edited digital e-book file, determining, by the host computing device, an automatically-determined chapter heading accuracy representing a total number of automatic edit operation tags not associated with one of the plurality of manual edit operation tags divided by a total number of chapter title style format designations applied to the e-book content;
for the first edited digital e-book file, determining, by the host computing device, a pipeline metric comprising an enhancement measurement representing a measure of changes from the original digital e-book file associated with the first edited digital e-book file to the first edited digital e-book file;
receiving, by the host computing device, a plurality of client-side metrics, wherein the plurality of client-side metrics includes a plurality of counter metrics and a plurality of timer metrics; and
displaying on a computer display a dashboard including:
(a) the automatically-determined chapter heading yield, (b) the automatically-determined chapter heading accuracy, (c) the enhancement measurement, (d) the plurality of counter metrics, and (e) the plurality of timer metrics.

2. The method of claim 1, further comprising:
for the plurality of edited digital e-book files, determining, by the host computing device, a plurality of server-side metrics, wherein a first server-side metric of the plurality of server-side metrics comprises a number of the plurality of edited digital e-book files in which the corresponding edited digital e-book file includes one or more interactive image elements; and
displaying in the dashboard a percentage of the plurality of edited digital e-book files in which the corresponding edited digital e-book file includes one or more interactive image elements.

3. The method of claim 1, further comprising:
based on the automatically-determined chapter heading yield and the automatically-determined chapter heading accuracy, modifying a software code corresponding to the computer-executed heuristic processing analysis to produce a modified software code corresponding to a modified executed heuristic processing analysis different than the computer-executed heuristic processing analysis.

4. A method of assessing performance of a digital media editing system, comprising:
receiving, by a first computing device, a plurality of original digital media files;
receiving, by the first computing device, a plurality of edited digital media files, wherein:
each of the edited digital media files is associated with a corresponding one of the plurality of original digital media files,
each of the edited digital media files comprises corresponding media content and corresponding metadata associated with the corresponding media content, and
for each of the edited digital media files, the corresponding metadata includes:
one or more computer-generated edit operation indicators, with each computer-generated edit operation indicator being associated with a corresponding portion of the media content and being generated during a computer-executed analysis of the media content to produce the edited digital media file, and one or more manual edit operation indicators, with each manual edit operation indicator being associated with a corresponding portion of the media content;
for a first edited digital media file of the plurality of edited digital media files, determining, by the first computing device, a computer-generated edit operation yield of the one or more computer-generated edit operation indicators; and
displaying on a computer display the computer-generated edit operation yield.

5. The method of claim 4, wherein:
for the first edited digital media file, each of the one or more computer-generated edit operation indicators represents a first edit operation performed on a corresponding portion of the media content based on a computer-executed analysis of the media content; and
for the first edited digital media file, each of the one or more manual edit operation indicators represents the first edit operation performed on a corresponding portion of the media content based on a corresponding user input.

6. The method of claim 5, further comprising:
based on the computer-generated edit operation yield, modifying software code corresponding to the computer-executed analysis to produce a modified software code corresponding to a modified computer-executed analysis different than the computer-executed analysis.

7. The method of claim 5, further comprising:
for the first edited digital media file, determining, by the first computing device, the computer-generated edit operation yield representing a total number of computer-generated edit operation indicators not associated with any of the one or more manual edit operation indicators divided by the total number of computer-generated edit operation indicators.

8. The method of claim 5, wherein:

each of the edited digital media files comprises an electronic book ("e-book") file;

for the first edited digital media file, each of the one or more computer-generated edit operation indicators represents a corresponding style format operation performed on the corresponding portion of the media content based on the computer-executed analysis of the media content; and for the first edited digital media file, each of the one or more manual edit operation indicators represents a corresponding style format operation performed on the corresponding portion of the media content based on the corresponding user input.

9. The method of claim 8, wherein:

for the first edited digital media file, each of the one or more computer-generated edit operation indicators represents a corresponding chapter title style format operation performed on the corresponding portion of the media content based on the computer-executed analysis of the media content; and for the first edited digital media file, each of the one or more manual edit operation indicators represents a corresponding chapter title style format operation performed on the corresponding portion of the media content based on the corresponding user input.

10. The method of claim 4, further comprising:

receiving, by the first computing device, one or more counter metrics associated with the first edited digital media file, wherein each of the one or more counter metrics comprises a number of times a corresponding operation was performed in the first edited digital media file.

11. The method of claim 4, further comprising:

receiving, by the first computing device, one or more timer metrics associated with the first edited digital media file, wherein each of the one or more timer metrics comprises a length of time to complete execution of a corresponding operation performed in the first edited digital media file.

12. The method of claim 4, further comprising:

determining, by the first computing device, a first collective metric associated with the plurality of edited digital media files.

13. The method of claim 12, further comprising:

determining, by the first computing device, the first collective metric associated with the plurality of edited digital media files, wherein the first collective metric comprises one or more of: a total number of edited digital media files received by the first computing device, a total number of edited digital media files of the plurality of edited digital media files including a first type of image element, an average number of a second type of image elements in the plurality of edited digital media files, and a category of media content of the plurality of edited digital media files.

14. The method of claim 4, further comprising:

for the first edited digital media file, determining, by the first computing device, an enhancement measurement representing a measure of changes from the original digital media file associated with the first edited digital media file to the first edited digital media file.

15. A computing device, comprising:

a display;

at least one processor; and a non-transitory computer-readable memory storing computer-executable instructions that, when executed by the at least one processor, program the at least one processor to:

receive, by a first computing device, a plurality of original digital media files;

receive, by the first computing device, a plurality of edited digital media files, wherein:

each of the edited digital media files is associated with a corresponding one of the plurality of original digital media files, each of the edited digital media files comprises corresponding media content and corresponding metadata associated with the corresponding media content, and for each of the edited digital media files, the corresponding metadata includes: one or more computer-generated edit operation indicators, with each computer-generated edit operation indicator being associated with a corresponding portion of the media content and being generated during a computer-executed analysis of the media content to produce the edited digital media file, and one or more manual edit operation indicators, with each manual edit operation indicator being associated with a corresponding portion of the media content;

for a first edited digital media file of the plurality of edited digital media files, determine, by the first computing device, a computer-generated edit operation yield of the one or more computer-generated edit operation indicators; and display on a computer display the computer-generated edit operation yield.

16. The computing device of claim 15, wherein:

for the first edited digital media file, each of the one or more computer-generated edit operation indicators represents a first edit operation performed on a corresponding portion of the media content based on a computer-executed analysis of the media content; and for the first edited digital media file, each of the one or more manual edit operation indicators represents the first edit operation performed on a corresponding portion of the media content based on a corresponding user input.

17. The computing device of claim 16, wherein the computer-executable instructions when executed by the at least one processor, program the at least one processor to:

based on the computer-generated edit operation yield, modify software code corresponding to the computer-executed analysis to produce a modified software code corresponding to a modified computer-executed analysis different than the computer-executed analysis.

18. The computing device of claim 15, wherein the computer-executable instructions when executed by the at least one processor, program the at least one processor to:

for the first edited digital media file, determine, by the first computing device, a computer-generated edit operation accuracy representing a total number of computer-generated edit operation indicators not associated with any of the one or more manual edit operation indicators divided by a number of instances of a first edit operation in the media content corresponding to the first edited digital media file.

19. A method of assessing performance of a digital media editing system, comprising:

receiving, by a first computing device, a plurality of original digital media files;

receiving, by the first computing device, a plurality of edited digital media files, wherein:
- each of the edited digital media files is associated with a corresponding one of the plurality of original digital media files,
- each of the edited digital media files comprises corresponding media content and corresponding metadata associated with the corresponding media content, and
- for each of the edited digital media files, the corresponding metadata includes: one or more computer-generated edit operation indicators, with each computer-generated edit operation indicator being associated with a corresponding portion of the media content, and one or more manual edit operation indicators, with each manual edit operation indicator being associated with a corresponding portion of the media content;

for a first edited digital media file of the plurality of edited digital media files, determining, by the first computing device, a computer-generated edit operation yield of the one or more computer-generated edit operation indicators, wherein the computer-generated edit operation yield represents a total number of computer-generated edit operation indicators not associated with any of the one or more manual edit operation indicators divided by the total number of computer-generated edit operation indicators; and displaying on a computer display the computer-generated edit operation yield.

* * * * *